US006404564B1

(12) United States Patent
Yamada

(10) Patent No.: US 6,404,564 B1
(45) Date of Patent: Jun. 11, 2002

(54) PROJECTION LENS

(75) Inventor: Hiroshi Yamada, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/531,572

(22) Filed: Mar. 20, 2000

(30) Foreign Application Priority Data

Mar. 25, 1999 (JP) ............................... 11-081576

(51) Int. Cl.[7] ........................ G02B 13/04; G02B 3/08; G02B 9/04

(52) U.S. Cl. ................... 359/749; 359/650; 359/651; 359/649; 359/749; 359/793

(58) Field of Search .................... 359/650, 651, 359/649, 749, 785, 687, 686, 691, 695, 689, 761, 762, 766, 770, 781, 784, 793

(56) References Cited

U.S. PATENT DOCUMENTS

| 5,113,288 A | | 5/1992 | Ohshita ...................... 359/739 |
| 5,900,987 A | * | 5/1999 | Krietzer ...................... 359/649 |
| 5,991,093 A | * | 11/1999 | Murata et al. .............. 359/691 |

* cited by examiner

*Primary Examiner*—Jordan Schwartz
*Assistant Examiner*—Tim Thompson
(74) *Attorney, Agent, or Firm*—Arnold International; Bruce Y. Arnold

(57) ABSTRACT

A projection lens having a first lens group of negative refractive power and a second lens group of positive refractive power, in order from the enlarging side of the projection lens. A stop is positioned within a specified distance of the projection lens element surface nearest the reducing side. The second lens group consists of four lens elements of positive, positive, negative, and positive refractive power, in order from the enlarging side. Specified conditions are preferably satisfied in order to make the projection lens compact and to ensure that various aberrations are favorably corrected.

6 Claims, 7 Drawing Sheets

Embodiment 1

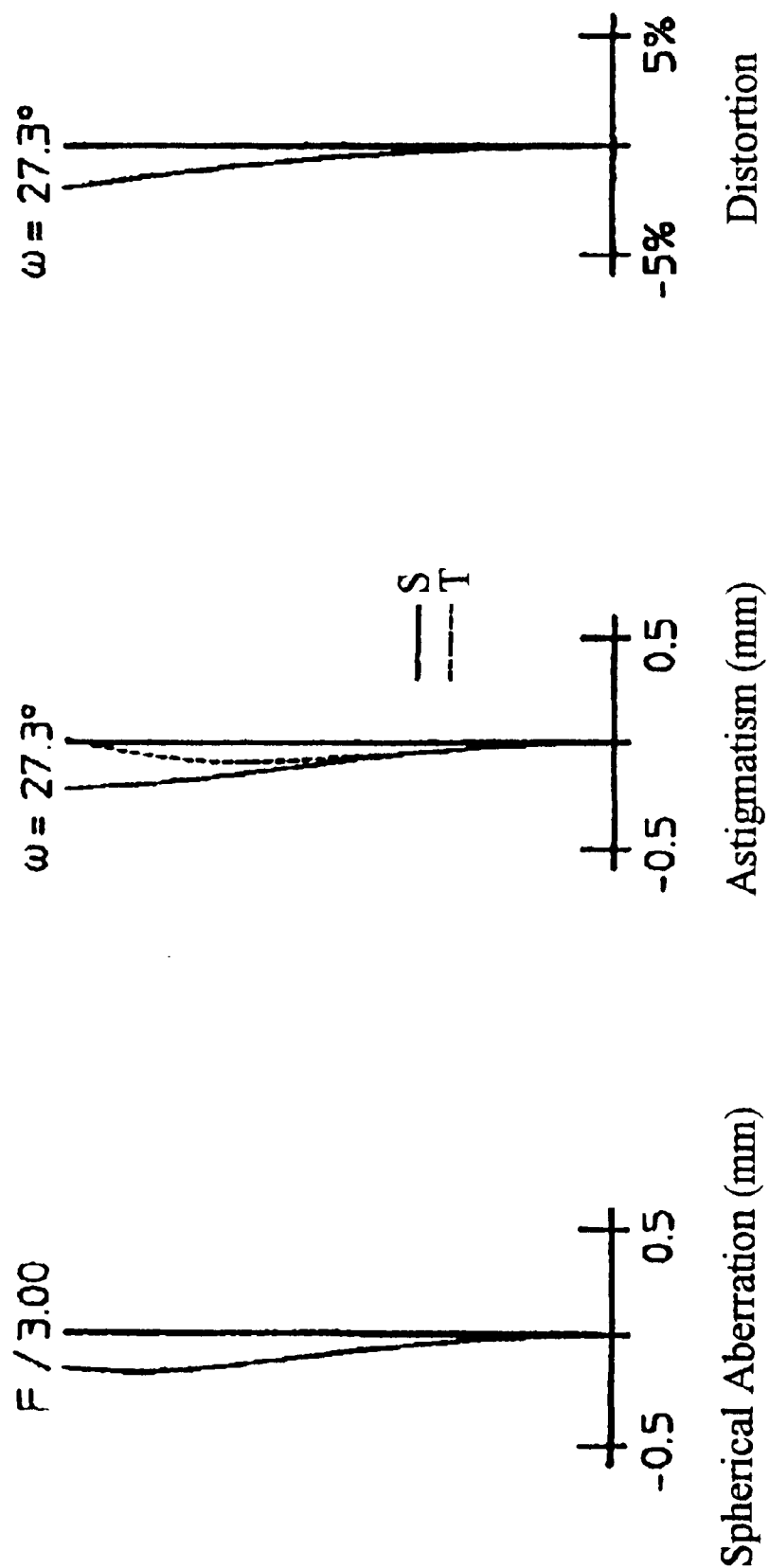

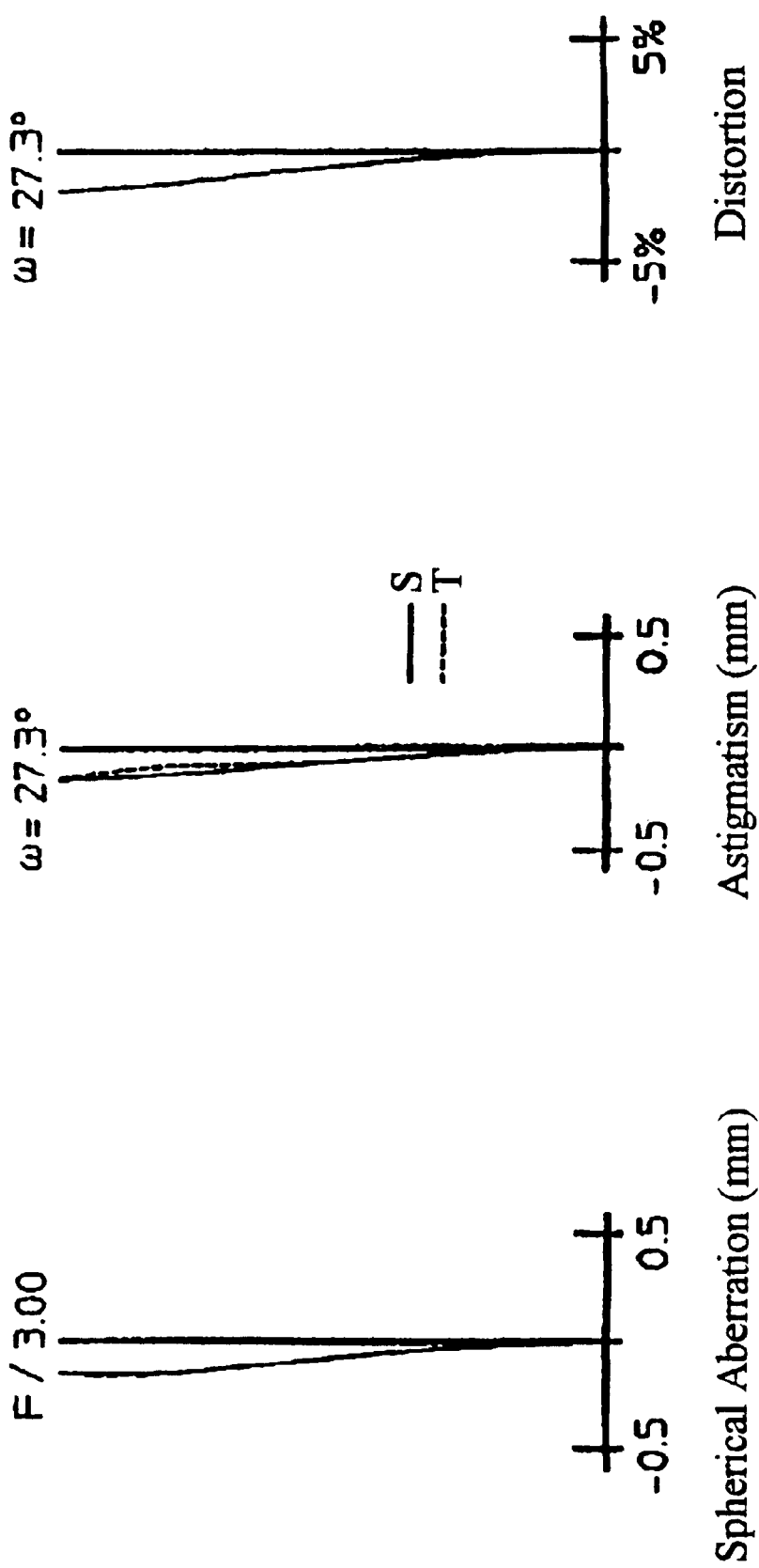

PROJECTION LENS

BACKGROUND OF THE INVENTION

Recently, projectors that use a digital micro-mirror device (hereinafter DMD) array instead of an LCD display have come to be known. A DMD array is made by forming highly-reflective, rectangular, micro-mirror elements on a silicon chip using CMOS semiconductor technology. The inclination of the surface of each mirror element can be changed about 10 degrees or more according to a video signal input to the chip. A projector using a DMD array can modulate a light beam with image information by controlling the direction of light reflected from the mirror surfaces in the DMD array, thereby concentrating only desired reflected light onto a screen so as to project a desired image.

A DMD array can provide several millions (or more) of mirrors in rows and columns on a substrate, with each mirror being controllable independently with digital signals. Thus, each mirror can modulate the light in one pixel of an image. By this means, a projector using a DMD array can provide high quality images having a significantly larger number of pixels than provided by conventional LCD projectors. Also, because the illuminating light does not need to be polarized, as required in LCD displays, DMD arrays have a relatively small loss of light from the light source to the display screen. In addition, with DMD arrays, accurate gradation of the intensity of light in each pixel is made possible. Thus, there is increasing demand for this type of display technology, especially for portable displays which are convenient to carry.

DMD display technology has created market demand for a projection lens that is compatible with such display technology. Thus, there is market demand for a projection lens that is compact, provides high-performance imaging as a result of the various aberrations being well-corrected, and provides a wide angle of view.

U.S. Pat. No. 5,113,288 to Ohshita discloses a photographic lens having a wide angle of view in which there are four lens elements. There is no disclosure in this patent that the lens could be used as a projection lens. Furthermore, whereas for ease of manufacture of the second lens element $L_2$ it might be obvious to form this lens element instead of two lens elements that are then joined. However, the two lens elements one of ordinary skill in the art would find obvious to substitute for the lens element $L_2$ would undoubtedly have positive and negative refractive power, respectively, in order from the object side.

BRIEF SUMMARY OF THE INVENTION

This invention relates to a projection lens used in projectors, especially to a projection lens for use with a projector that employs a DMD array. The object of the invention is to provide a projection lens having a pupil surface on the enlarging side (i.e, in the direction of the display screen) of the lens, to thereby enable the projection lens to achieve high performance imaging with a wide angle of view.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4C show the spherical aberration, astigmatism, and distortion, respectively, of the projection lens of Embodiment 1, FIGS. 6A–6C show the spherical aberration, astigmatism, and distortion, respectively, of the projection lens of Embodiment 3.

DETAILED DESCRIPTION

The projection lens of this invention is formed of two lens groups having negative and positive refractive power, respectively, in order from the enlarging side of the projection lens (i.e., the side nearest the projection screen). The first lens group is formed of one or more lens elements, and the second lens group is formed of four lens elements having positive, positive, negative and positive refractive power, in sequential order from the enlarging side of the projection lens.

Also, it is preferable that the projection lens satisfies the following Conditions (1) and (2):

$0.7 < f_2/f < 1.4$      Condition (1)

$0.5 < d/f < 1.3$      Condition (2)

where $f_2$ is focal distance of the second lens group, and f is the focal length of the projection lens, and d is distance between the first lens group and the second lens group.

Figure 7:
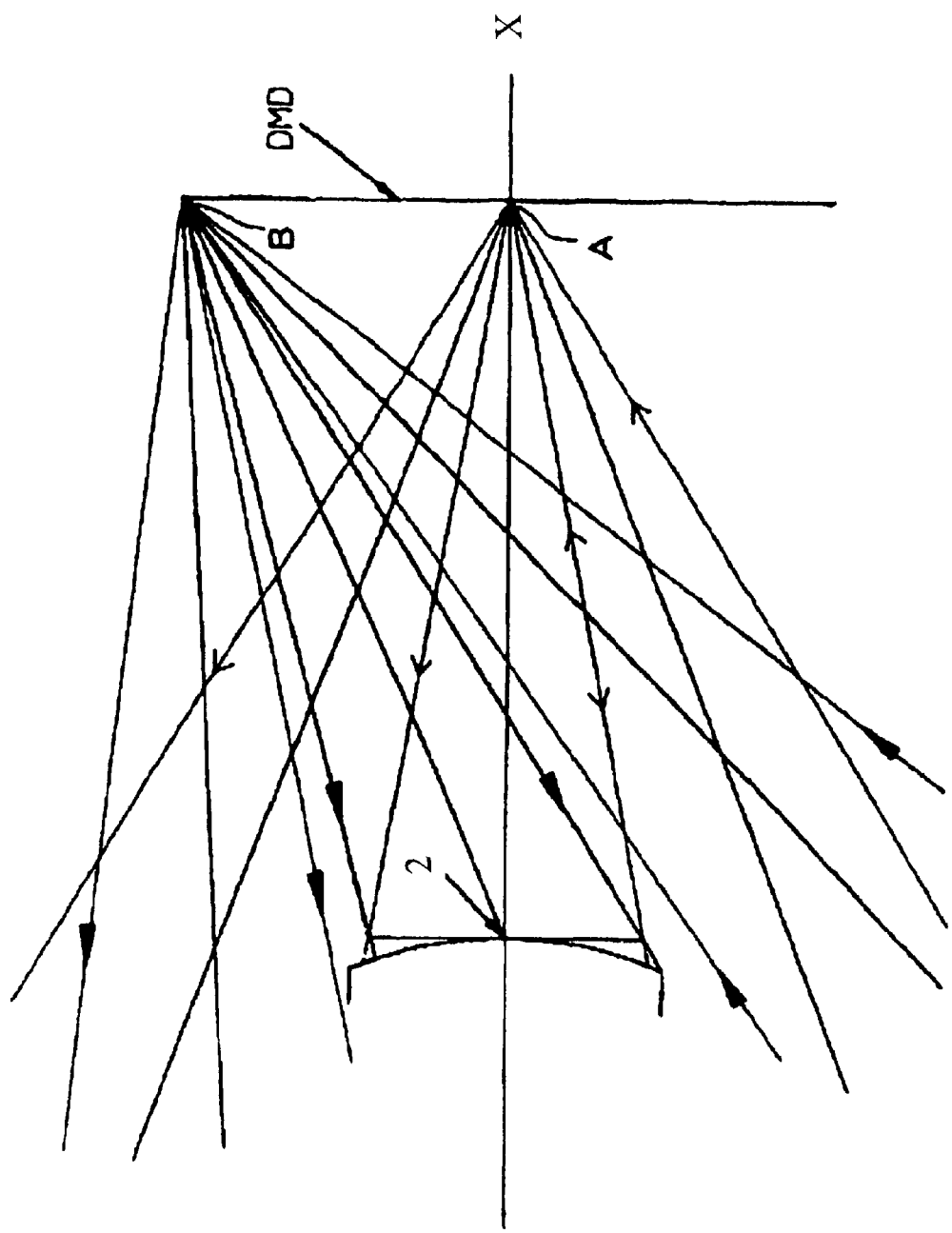
FIG. 7 is a schematic diagram which shows the operation of the stop 2 of the invention for light which illuminates a DMD array which is positioned on the reducing side of the lens, with the light illuminating light source being on the enlarging side of the projection lens.

A stop is positioned within a distance of $|0.5f|$ from the lens surface of the projection lens nearest the reducing side (i.e., the side nearest the DMD). As shown in FIG. 7, the stop 2 ensures that the reflected light flux necessary for projection is incident onto the projection lens while preventing reflected light unnecessary for projection from entering the projection lens, regardless of whether the light flux is reflected from an element A positioned in the center of the DMD (i.e., an element on the optical axis X) or is reflected from an element B positioned in the periphery of the DMD.

It is also preferable that the projection lens satisfies the following Condition (3) and (4):

$N_{d\,AVE} > 1.70$      Condition (3)

$\nu_d < 40$      Condition (4)

where $N_{dAVE}$ is the average refractive index of the three positive lens elements of the second lens group $G_2$, and $\nu_d$ is the Abbe number of the negative lens element of the second lens group $G_2$.

By arranging the stop at or within a specified distance of the projection lens surface nearest the reducing side, it becomes possible to limit the angle at which rays are incident onto the projection lens surface nearest the reducing side, thereby reducing the projection lens aberrations when imaging the light from the DMD array onto a screen. Further, the stop enables the outer diameters of the lens elements of the second lens group to be reduced in diameter.

If the lower limit of Condition (1) is not satisfied, the outer diameter(s) of the lens element(s) of first lens group will be large and the curvature of field will be excessive. On the other hand, if the upper limit of Condition (1) is exceeded, the back focus of the projection lens will be too long, thereby preventing a compact arrangement projecting light reflected from a DMD array.

If the lower limit of Condition (2) is not satisfied, the refractive power of the first lens group must be made stronger, which generates excessive coma and negative curvature of field. On the other hand, if the upper limit of Condition (2) is exceeded, the projection lens length will become too long.

By satisfying Condition (3), spherical aberration and coma can be well-corrected. By satisfying Condition (4), chromatic aberration can be well-corrected.

Various embodiments of the projection lens of the invention will now be set forth in detail.

Embodiment 1

Figure 1:
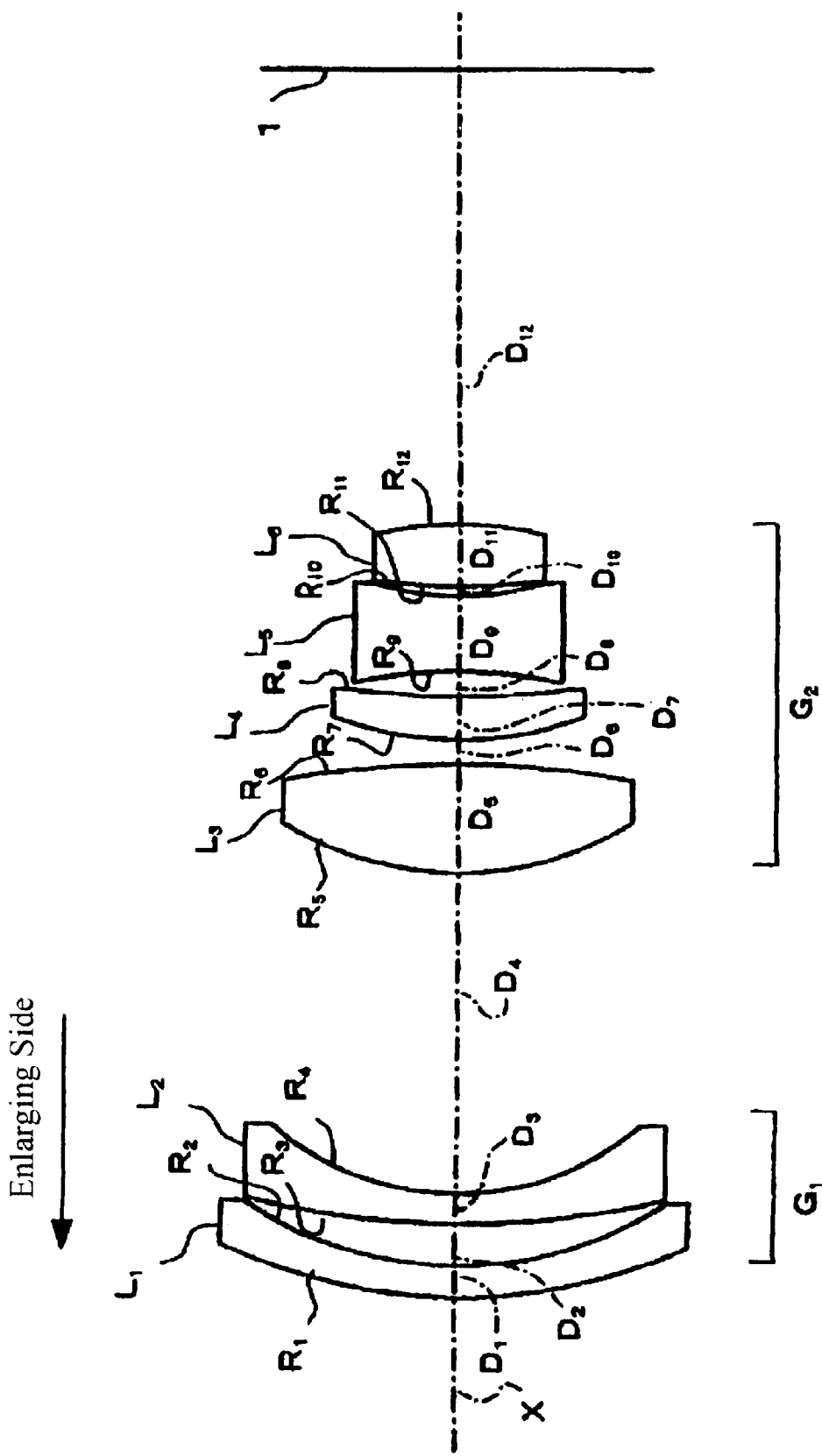
FIG. 1 shows the lens element configuration of the projection lens of Embodiment 1 of this invention.

FIG. 1 shows the lens element configuration for this embodiment, in which the first lens group $G_1$ is formed of two lens elements, $L_1$ and $L_2$, both of negative meniscus shape with their convex surfaces on the enlarging side. The second lens group $G_2$ is formed of: a third lens element $L_3$ that is bi-convex having surfaces of different refractive power, with the surface of smaller radius of curvature on the enlarging side; a fourth lens element $L_4$ of positive meniscus shape with its convex surface on the enlarging side; a fifth lens element $L_5$ that is bi-concave having surfaces of different refractive power, with the surface of larger radius of curvature on the enlarging side; and a sixth lens element $L_6$ that is bi-convex having surfaces of different refractive power, with the surface of larger radius of curvature on the enlarging side. A stop (not illustrated) is positioned on the surface $R_{12}$ of the sixth lens element nearest the reducing side.

The top portion of Table 1 below lists, in sequential order from the enlarging side of the projection lens, the radius of curvature R (in mm) of each lens element surface, the surface spacing D (in mm), as well as the index of refraction $N_d$ and the Abbe number $v_d$ (at the sodium d line) of each lens element of this embodiment. The bottom portion of Table 1 lists the focal distance f (in mm) of the projection lens, the focal distance $f_2$ (in mm) of the second lens group, the values for the ratios $f_2/f$ and d/f, and the average of the index of refraction $N_{d\,AVE}$ of the three positive lens elements in group $G_2$ for this embodiment.

TABLE 1

| # | R | D | $N_d$ | $v_d$ |
|---|---|---|---|---|
| 1 | 34.4995 | 2.10000 | 1.67003 | 47.2 |
| 2 | 23.8795 | 2.83725 | 1.00000 | |
| 3 | 56.0700 | 2.00000 | 1.62374 | 47.0 |
| 4 | 17.9307 | 21.18967 | 1.00000 | |
| 5 | 20.5185 | 7.31151 | 1.58144 | 40.9 |
| 6 | −57.2746 | 1.57519 | 1.00000 | |
| 7 | 21.9231 | 2.94241 | 1.80420 | 46.5 |
| 8 | 46.8435 | 1.70428 | 1.00000 | |
| 9 | −31.0208 | 4.99974 | 1.80518 | 25.5 |
| 10 | 17.1555 | 0.68743 | 1.00000 | |

TABLE 1-continued

| # | R | D | $N_d$ | $v_d$ |
|---|---|---|---|---|
| 11 | 41.0194 | 4.15757 | 1.80420 | 46.5 |
| 12 | −23.2391(stop) | | | |
| f = 24.54 | $f_2$ = 24.88 | $f_2/f$ = 1.01 | d/f = 0.863 | $N_{dAVE}$ = 1.73 |

As is clear from Table 1, the projection lens of this embodiment satisfies each of the above Conditions (1)–(4), thus providing imaging with favorable aberrations while enabling the projection lens to be miniaturized.

FIGS. 4A–4C show the spherical aberration, astigmatism in the sagittal S and tangential T planes, and % distortion, respectively, for the projection lens of this embodiment. As is clear from FIGS. 4A–4C, a projection lens that can provide a high quality image over a half-image angle ω equal to 27.3 degrees is provided according to this embodiment.

Embodiment 2

Figure 2:
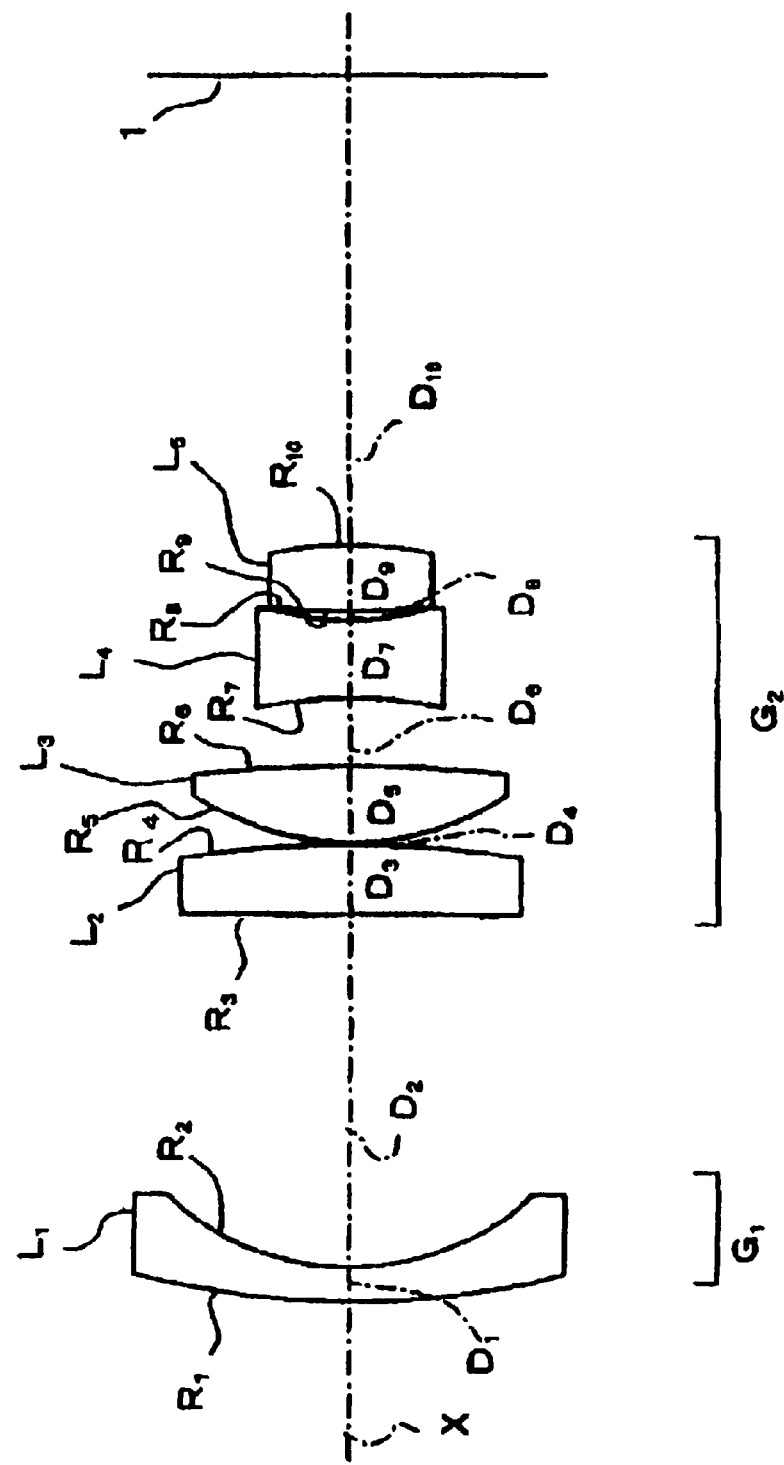
FIG. 2 shows the lens element configuration of the projection lens of Embodiment 2 of this invention.

FIG. 2 shows the lens element configuration for this embodiment, in which the first lens group is formed of a single lens element $L_1$ of negative meniscus shape with its convex surface on the enlarging side. The second lens group $G_2$ is formed of a second lens element $L_2$ of positive refractive power and meniscus shape, with its concave surface on the enlarging side; a third lens element $L_3$ that is bi-convex having surfaces of different refractive power, with the surface of smaller radius of curvature on the enlarging side; a fourth lens element $L_4$ that is bi-concave having surfaces of different refractive power, with the surface of larger radius of curvature on the enlarging side; and a fifth lens element $L_5$ that is bi-convex having surfaces of different refractive power, with the surface of larger radius of curvature on the enlarging side. A stop (not illustrated) is positioned on the surface $R_{10}$ of the fifth lens element nearest the reducing side The top portion of Table 2 below lists, in sequential order from the enlarging side of the projection lens, the radius of curvature R (in mm) of each lens element surface, the surface spacing D (in mm), as well as the index of refraction $N_d$ and the Abbe number $v_d$ (at the sodium d line) of each lens element of this embodiment. The bottom portion of Table 2 lists the focal distance f (in mm) of the projection lens, the focal distance $f_2$ (in mm) of the second lens group, the values for the ratios $f_2/f$ and d/f, and the average of the index of refraction $N_{d\,AVE}$ of the three positive lens elements in group $G_2$ for this embodiment.

TABLE 2

| # | R | D | $N_d$ | $v_d$ |
|---|---|---|---|---|
| 1 | 54.1866 | 2.19984 | 1.75500 | 52.3 |
| 2 | 16.7687 | 22.79121 | 1.00000 | |
| 3 | −6194.8657 | 4.49450 | 1.83400 | 37.3 |
| 4 | −65.9473 | 0.19999 | 1.00000 | |
| 5 | 18.0461 | 4.87902 | 1.65160 | 58.4 |
| 6 | −89.1725 | 4.30694 | 1.00000 | |
| 7 | −29.2802 | 4.99998 | 1.75520 | 27.5 |
| 8 | 16.7757 | 0.61710 | 1.00000 | |
| 9 | 44.8386 | 4.31208 | 1.80420 | 46.5 |
| 10 | −24.2874 (stop) | | | |
| f = 24.52 | $f_2$ = 25.52 | $f_2/f$ = 1.04 | d/f = 0.929 | $N_{dAVE}$ = 1.76 |

As is clear from the bottom portion of Table 2, the projection lens of this embodiment satisfies each of the above Conditions (1)–(4), thus providing imaging with favorable aberrations while enabling the projection lens to be miniaturized.

Figures 5A, 5B, 5C:
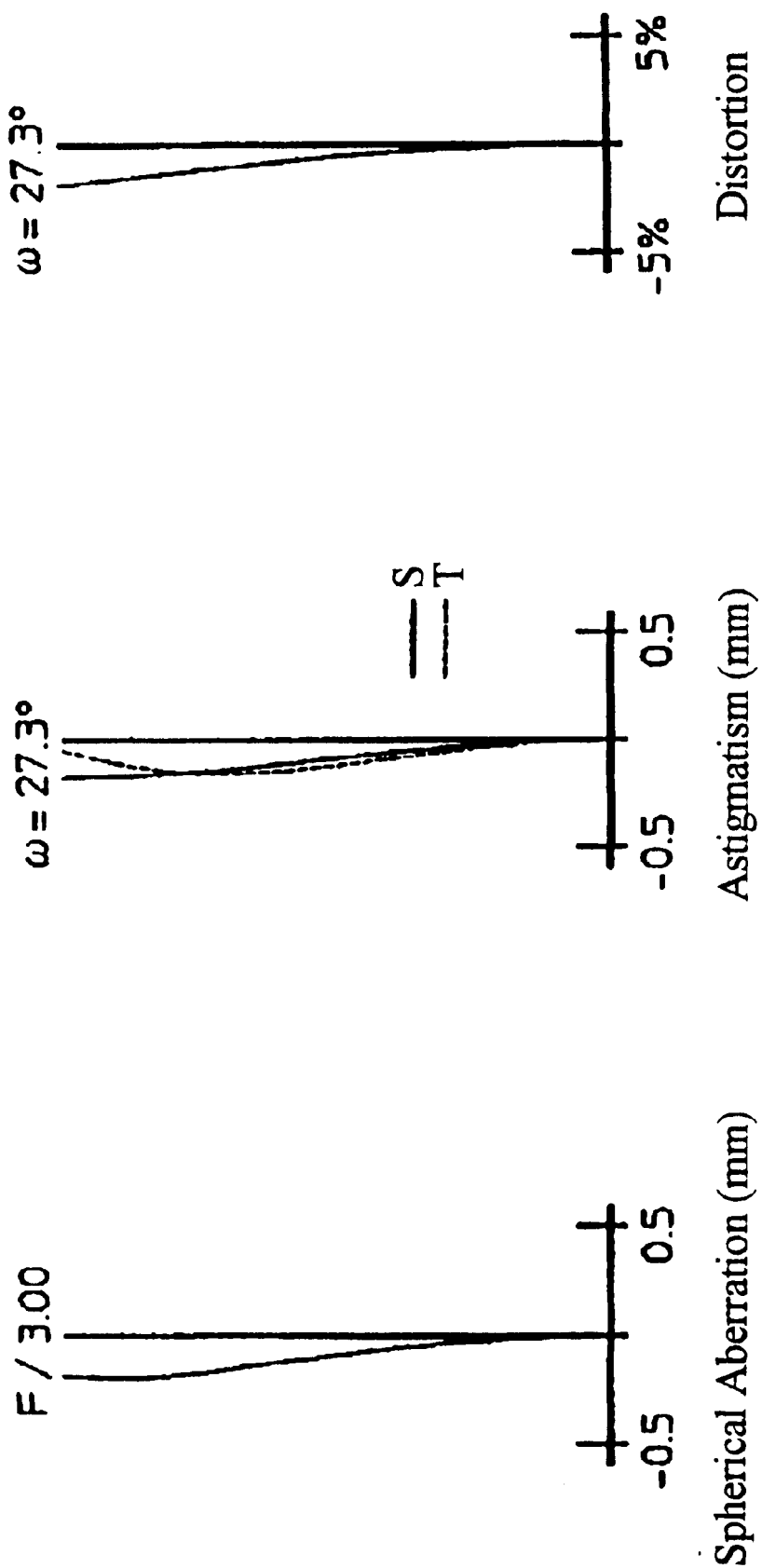
FIGS. 5A–5C show the spherical aberration, astigmatism, and distortion, respectively, of the projection lens of Embodiment 2.

FIGS. 5A–5C show the spherical aberration, astigmatism in the sagittal S and tangential T planes, and the % distortion, respectively, for the projection lens of this embodiment. As is clear from FIGS. 5A–5C, a projection lens that can provide a high quality image over a half-image angle ω equal to 27.3 degrees it provided according to this embodiment.

Embodiment 3

Figure 3:
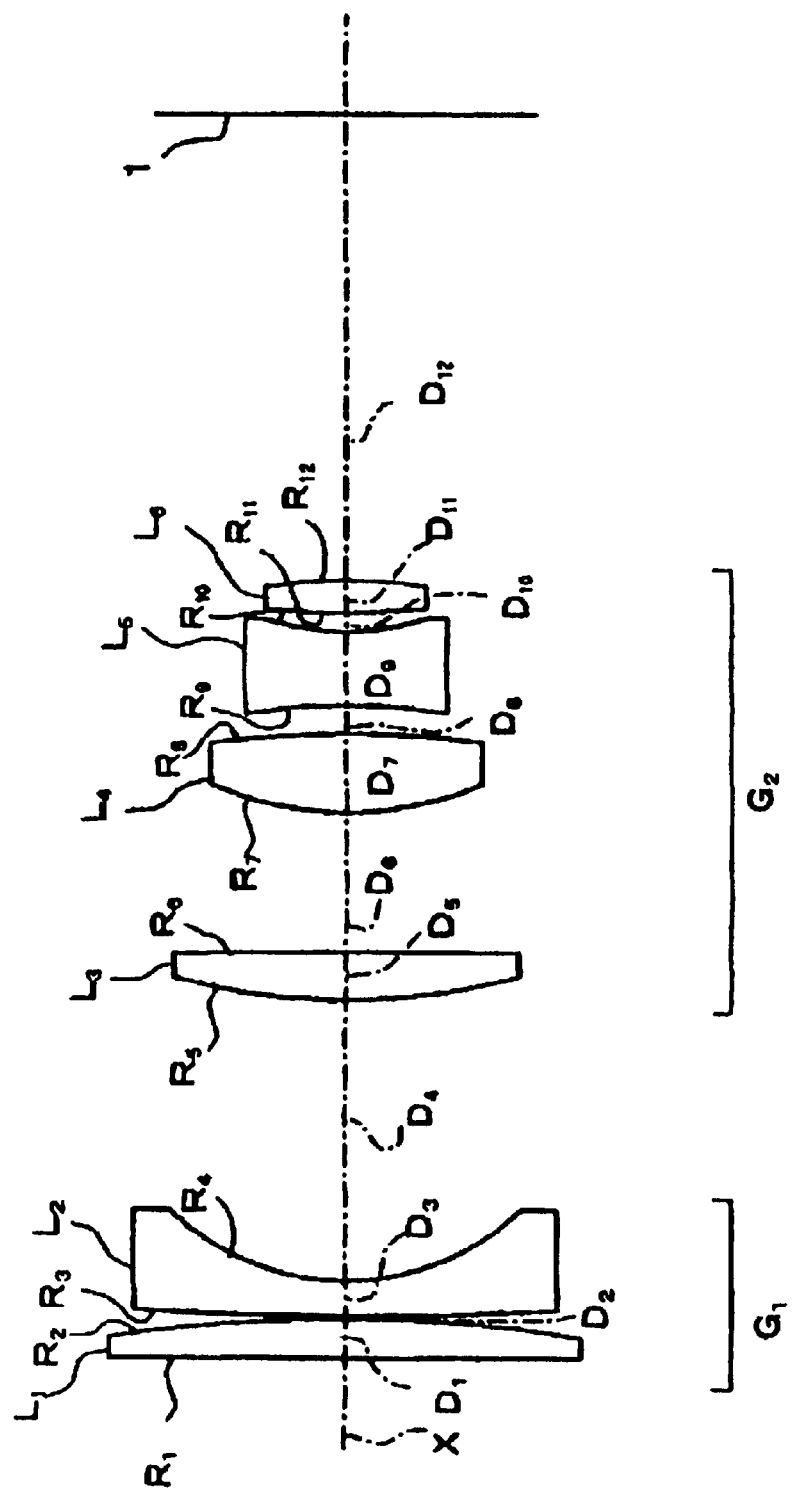
FIG. 3 shows the lens element configuration of the projection lens of Embodiment 3 of this invention.

FIG. 3 shows the lens element configuration for this embodiment, in which the first lens group $G_1$ is formed of a first lens element $L_1$ that is planar-convex lens with its planar surface on the enlarging side, and a second lens element $L_2$ that has negative refractive power and a meniscus shape, with its convex surface on the enlarging side. The second lens group $G_2$ is formed of four lens elements, as follows: A third lens element $L_3$ and a fourth lens element $L_4$ are both bi-convex having opposite sides of different refractive power, each with its surface of smaller radius of curvature on the enlarging side; a fifth lens element $L_5$ is bi-concave having surfaces of different refractive power, with its surface of larger radius of curvature on the enlarging side, and a sixth lens element $L_6$ that is bi-convex having surfaces of different refractive power, with its surface of larger radius of curvature on the enlarging side. A stop (not illustrated) is positioned on the surface $R_{12}$ of the sixth lens element nearest the reducing side.

The top portion of Table 3 below lists, in sequential order from the enlarging side of the projection lens, the radius of curvature R (in mm) of each lens element surface, the surface spacing D (in mm), as well as the index of refraction $N_d$ and the Abbe number $v_d$ (at the sodium d line) of each lens element of this embodiment. The bottom portion of Table 3 lists the focal distance f (in mm) of the projection lens, the focal distance $f_2$ (in mm) of the second lens group, the values for the ratios $f_2/f$ and $d/f$, and the average of the index of refraction $N_{dAVE}$ of the three positive lens elements in group $G_2$ for this embodiment.

TABLE 3

| # | R | D | $N_d$ | $v_d$ |
|---|---|---|---|---|
| 1 | ∞ | 2.69027 | 1.51680 | 64.2 |
| 2 | −94.3120 | 0.20001 | 1.00000 | |
| 3 | 310.2722 | 2.20000 | 1.72000 | 50.3 |
| 4 | 16.6177 | 18.75456 | 1.00000 | |
| 5 | 43.8400 | 3.26017 | 1.83400 | 37.3 |
| 6 | −709.2963 | 10.10445 | 1.00000 | |
| 7 | 22.1592 | 4.16703 | 1.77250 | 49.6 |
| 8 | −72.8366 | 2.21050 | 1.00000 | |
| 9 | −39.9606 | 4.99996 | 1.80518 | 25.5 |
| 10 | 17.1344 | 1.10324 | 1.00000 | |
| 11 | 47.7801 | 2.31596 | 1.80420 | 46.5 |
| 12 | −30.4603 (stop) | | | |
| f = 24.53 | $f_2$ = 25.46 | $f_2/f$ = 1.04 $d/f$ = 0.765 | $N_{dAVE}$ = 1.80 | |

As from the bottom portion of Table 3, the projection lens of this embodiment above Conditions (1)–(4), thus providing imaging with favorable nabling the projection lens to be miniaturized.

FIGS. 6A–6C show the spherical aberration, astigmatism in the sagittal S and tangential T planes, and the % distortion, respectively, for the projection lens of this embodiment. As is clear form FIGS. 6A–6C, a projection lens that can provide a high quality image over a half-image angle ω equal to 27.3 degrees is provided according to this embodiment.

FIG. 7 is a schematic diagram which shows the operation of the stop 2 of the invention for light which illuminates a DMD array which is positioned on the reducing side of the lens, with the light illuminating light source being on the enlarging side of the projection lens. Rather than being positioned on a lens element surface, the stop 2 in this instance is formed as a planar surface that is immediately adjacent the lens element surface nearest the reducing side. However, the stop 2 will be operative provided it is positioned between the projection lens and the DMD array and within a distance of |0.5f| of the lens element surface nearest the reducing side, where f is the focal distance of the projection lens.

As explained above, according to the invention, a wide angle image is achieved by using a projection lens of the retro-focus type (i.e., having the first lens group on the enlarging side be of negative refractive power). Further, the second lens group is formed of four lens elements of positive, positive, negative, and positive refractive power, and a stop is positioned so that reflected light for projection of image data can enter the projection lens and yet light unnecessary for projection of image data is blocked from entering the projection lens, regardless of whether the light is reflected from a pixel element of the DMD near the optical axis or near the periphery of the DMD. In this way, it is possible to maximize the image light while enabling the projection lens to be miniaturize by reducing the outer diameter of the second lens group. Furthermore, by satisfying the specified conditions, a high quality image having favorable aberrations is assured.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A projection lens formed of only two lens groups which are arranged sequentially in order from the enlarging side of the projection lens as follows:

a first lens group having negative refractive power;

a second lens group having positive refractive power, said second lens group consisting of four lens elements of positive, positive, negative, and positive refractive power, respectively, in sequential order from the enlarging side;

a stop positioned within a distance of |0.5 f| from the lens element surface nearest the reducing side of the projection lens, where f is the focal distance of the projection lens;

said projection lens further satisfying the following conditions:

$0.7 < f_2/f < 1.4$ $0.5 < d/f < 1.3$ where
- d is the distance between the first lens group and the second lens group, and
- $f_2$ is the focal distance of the second lens group.

2. The projection lens of claim 1, said projection lens further satisfying the following conditions:

$$N_{d\,AVE} > 1.70$$

$$v_d < 40$$

where
- $N_{d\,AVE}$ is the average refractive index of the three positive lens elements of the second lens group, and
- $v_d$ is the Abbe number of the negative lens element in the second lens group.

3. The projection lens of claim 1, said projection lens further satisfying the following conditions:

$$N_{d\,AVE} > 1.70$$

$$v_d < 40$$

where
- $N_{d\,AVE}$ is the average refractive index of the three positive lens elements of the second lens group, and
- $v_d$ is the Abbe number of the negative lens element in the second lens group.

4. The projection lens of claim 1, in combination with a DMD array.

5. The projection lens of claim 2, in combination with a DMD array.

6. The projection lens of claim 3, in combination with a DMD array.

* * * * *